May 31, 1932.    A. M. LOFLAND    1,861,187
DUAL WHEEL FOR DEMOUNTABLE RIMS
Filed Aug. 16, 1927    2 Sheets-Sheet 1
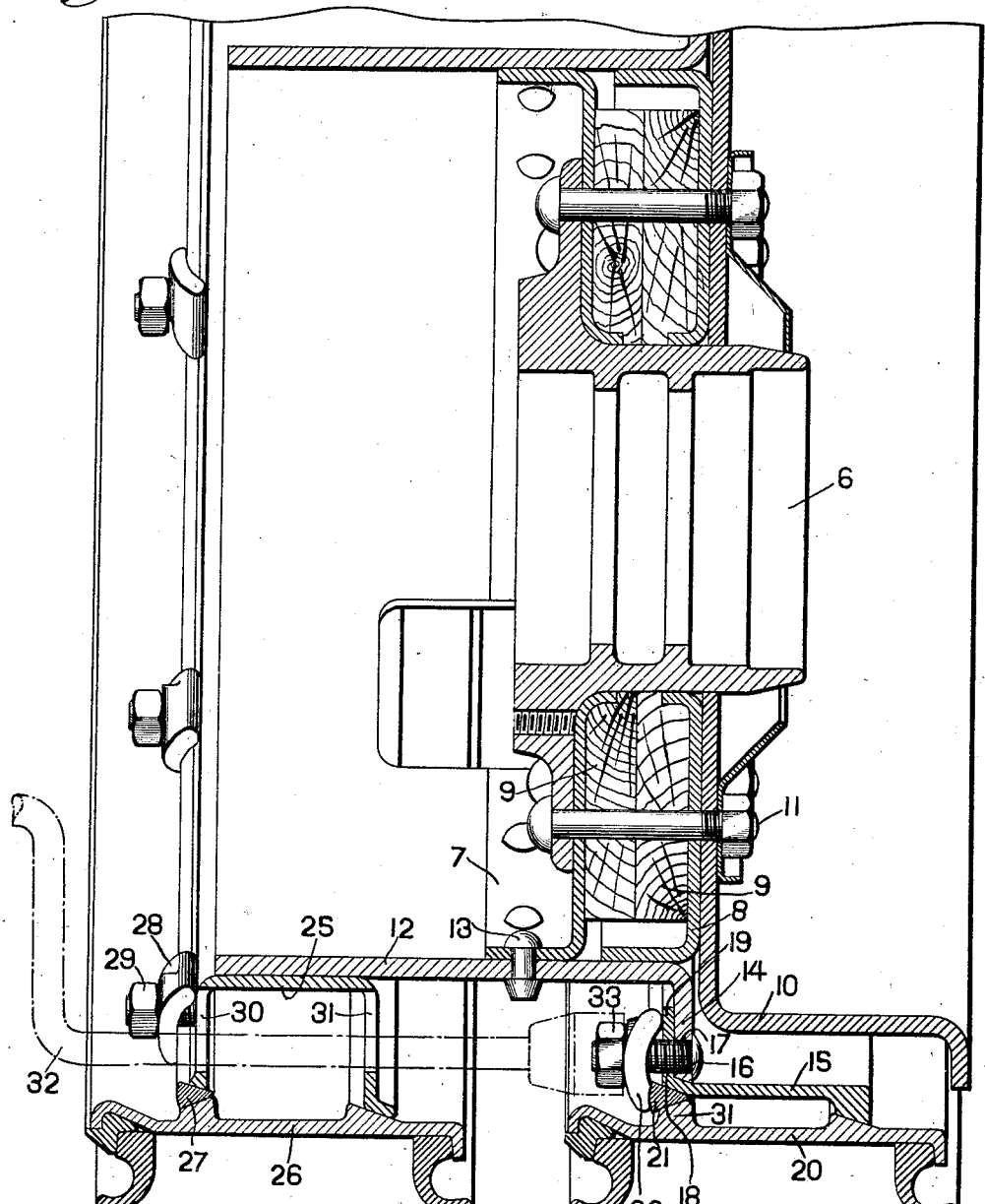
Fig.1,
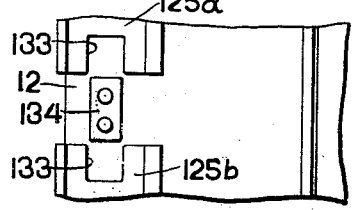
Fig.6.
Inventor
ALFRED M. LOFLAND
By his Attorneys
Bohleber & Ledbetter May 31, 1932.  A. M. LOFLAND  1,861,187
DUAL WHEEL FOR DEMOUNTABLE RIMS
Filed Aug. 16, 1927  2 Sheets-Sheet 2
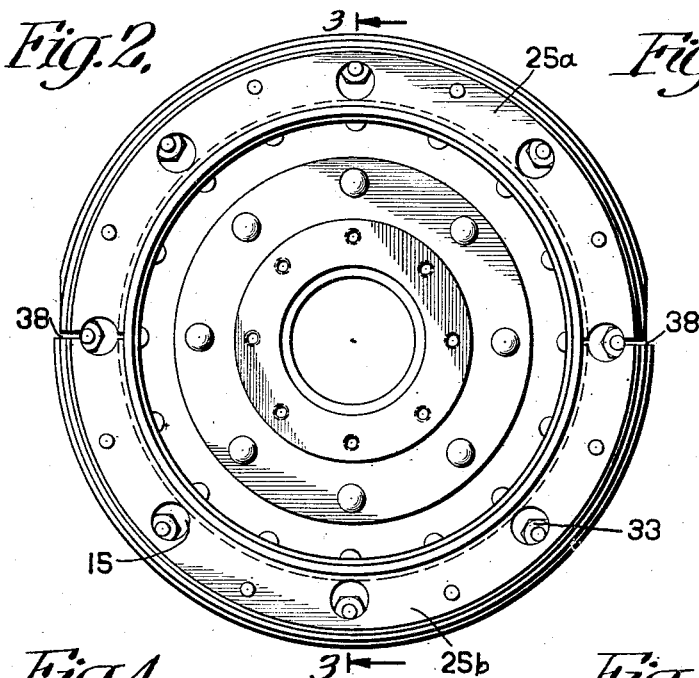
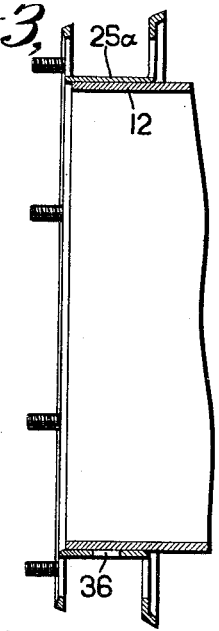
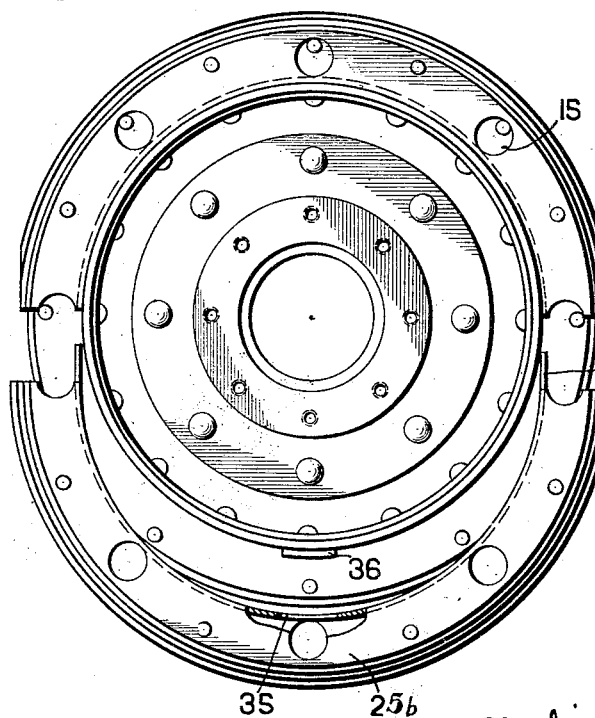
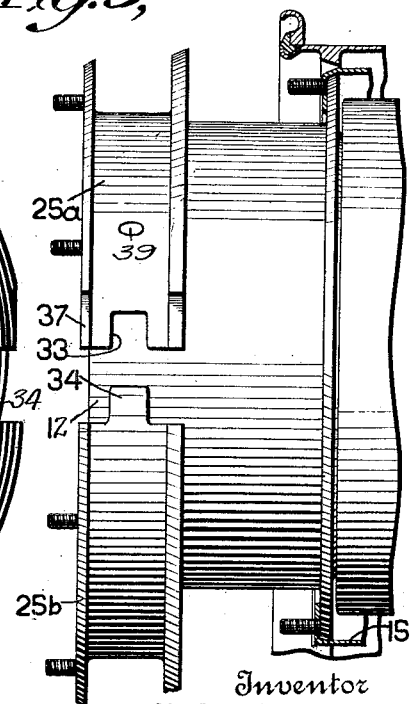
Inventor
ALFRED M. LOFLAND
By his Attorneys
Bohleber & Ledbetter Patented May 31, 1932

1,861,187

UNITED STATES PATENT OFFICE

ALFRED M. LOFLAND, OF LEBANON, INDIANA, ASSIGNOR OF ONE-HALF TO LEWIS C. WILLIS, OF INDIANAPOLIS, INDIANA

DUAL WHEEL FOR DEMOUNTABLE RIMS

Application filed August 16, 1927. Serial No. 213,236.

This invention relates to wheels, and more particularly to a wheel structure adapted to carry two demountable tires.

One object of the invention is the provision of a wheel of the character described which shall permit the tightening or adjustment of the inboard rim and tire without necessitating the removal of the outboard rim or tire. To this end, provision is made for passing a socket wrench through suitable passages in the outboard felloe to engage the bolts securing the inboard rim in position.

Another object of the invention is the provison of a demountable felloe which shall permit the foregoing object to be attained. Accordingly, the master felloe is formed of a reduced diameter having a flange on its axially inward side to which perferably a standard felloe for the inboard rim may be secured while a special felloe of material depth in a radial direction is provided for the outboard rim and is formed with registering apertures for the passage of the socket wrench.

The invention also has for its object the facilitation of the removal of the inboard rim with or without a tire mounted thereon. To this end the outboard felloe member is seperated into a plurality of segmental parts, one or all of which are demountable or removable. Certain of the felloe sections may be carried permanently with the master felloe, if desired, and are so formed as to facilitate the removal of the inboard rim thereover as by having their peripheral corners bevelled while other of the segmental felloe sections are adapted to be demountably secured to the master felloe in an easily removable manner as by being retained in interlocking relationship by the outer rim and its clamping means.

These and other objects of the invention and the means for their attainment will be more apparent from the following detailed description, taken in connection with the accompanying drawings illustrating a preferred embodiment thereof, in which:

Figure 1 is a vertical sectional view taken on a diameter of the wheel and showing the construction thereof.

Figure 2 is a view in side elevation showing the wheel with the removable felloe in position.

Figure 3 is a section on the line 3—3 of Figure 2.

Figure 4 is a view similar to Figure 2 but showing the removable section of the outer felloe displaced.

Figure 5 is a view in elevation of the structure shown in Figure 4 looking from the right.

Figure 6 is a fragmentary view showing a modification of the removable felloe section positioning means.

Referring first to Figure 1 it will be noted that the wheel comprises a unitary hub 6 formed to receive an outer web 7 and an inner web 8, suitably spaced by the wood blocks 9, and a brake drum 10 all bolted together by a single series of bolts 11.

A master felloe 12 rests upon the outwardly turned edges of the web members 7 and 8 to which it is secured by the rivets 13 and/or suitable welding. The master felloe 12 is a cylindrical member which carries a flange 14 on the axially inward side thereof to which may be secured a unitary inner felloe member or sub-felloe 15 which is illustrated as of standard design, such as may be purchased in the open market, for instance, a Firestone felloe and this felloe member is adapted to be positioned on flange 14 and secured thereon by spot welding and in part by the bolts 16 which pass through registering apertures 17 and 18 respectively in the flange 14 and in an inwardly directed flange 19 found on the outer edge of the flanged felloe 15. It is, of course, never necessary to remove this felloe for the purpose of changing tires and the like, and it is therefore not necessary to secure it in position demountably. The flange 19 is therefore preferably spot welded to the flange 14 on the master felloe, as just described.

Sub-felloe member 15 may accommodate preferably any rim of the type designed to fit therewith such for example as the Firestone rim shown at 20 and held in position by means of the wedge ring 21, clamps 22, and nuts 33 on the bolts 16. As the specific structure of this felloe member 15, rim 20 and the various rings, clamps, etc. for securing the rim to the felloe are per se not my invention, but are elements well known in the art, they are not described in detail.

On the axially outward side of the wheel, that is, the left hand side as viewed in Figure 1, the master felloe 12 carries an outboard sub-felloe member 25 of a radial depth relatively greater than the flanged felloe 15 and equivalent to the radial depth of the flange 14, and felloe 15 and this deep section sub-felloe 25 is formed with beveled peripheral surfaces on its radially outer circumference to receive preferably a standard rim 26 and a wedge ring 27 held in position, for example by means of clamps 28 and bolts 29.

One of the most important features of this invention consists in a construction which enables the tightening of the inboard rim 20 without the necessity of removing the outboard rim 26 and/or the tire thereon and to enable this to be accomplished, the outboard felloe 25 is formed with registering apertures 30 and 31 forming a passage to permit the insertion of a suitable socket wrench, such as is indicated in dotted lines at 32, in an axial direction to engage the nuts 33 on the bolts 16 and tighten or loosen them as desired. The formation of these passages 30, 31, of course, necessitates the provision of a deep section sub-felloe 25, as it may be called, which in turn requires the provision of a master felloe of a diameter materially less than heretofore, which, in order to permit the seating of the standard rim 15 is formed with the flange 14. Obviously the master felloe may be formed of any suitable material, for instance, cast steel malleable iron, rolled wrought iron, steel, etc. Thus the construction of the wheel is simplified and the use of a standard sub-felloe on the inboard side is permitted.

If the removal of rim 20 is desired it is, of course, necessary to remove the rim 26 first and also all or a part, at least, of the outboard sub-felloe 25. To this end, in the illustrated embodiment, outboard sub-felloe 25 is formed of the two parts 25a and 25b seen in Figures 2 and 4. Both of these parts 25a and 25b may be removably mounted on the master felloe and positioned by means of key and slot connections 36, 35 as shown in Figure 4 or one of the parts, say, the part 25a may be adapted to be permanently secured to the master felloe 12 by any suitable method or means such as by spot welding 39 while the other part 25b is removably secured in position. It will be observed that one of the section ends say those of the sub-felloe section 25a are formed with recesses 33 which are adapted to receive tongues 34 formed on or carried with the adjacent ends of the sub-felloe section 25a. If sub-felloe section 25a is permanently secured to the master felloe it may be formed with the recesses 33 and between its ends, section 25b may be formed with the rectangular aperture 35 to receive the key or driving plate 36 carried with the master felloe 12 (Fig. 4). Obviously, other constructions preventing axial movement of free felloe sections may be resorted to, such as, for instance, the plate 134 (Fig. 6) secured to master felloe 12 which is adapted to be received in cooperating recesses 133 in adjacent ends of both felloe sections 125a, 125b. The ends of the felloe sections 25a and 25b have a clearance space 38 therebetween.

When it is desired to remove inboard rim 20 and the tire carried thereon, the first step is the removal of the outboard tire with its rim 26. The next step is the removal of the sub-felloe sections which is accomplished by removing the sections radially with respect to the master felloe 12, thereby withdrawing the said sections from the keys 36 and at the same time withdrawing the tongues 34 at each end thereof from the correspondingly shaped slots or recesses 33 in the companion sub-felloe section. It will, of course, be understood that the tongues 34 may be mounted on section 25a and the slots 33 formed in the ends of section 25b. Where one of the sub-felloe sections, say 25a is permanently secured to the master-felloe only removable section 25b is moved radially as will be understood.

Obviously; before one or more of the sub-felloe sections can be removed, it is necessary to remove rim 26 by the loosening of the clamps 28 and removal of wedge ring 27 in the usual manner.

To mount or remove the rim 20 in a situation where sub-felloe section 25a is fixed sub-felloe section 25b is removed as has just been described and rim 20 may then be slipped over sub-felloe section 25a and master felloe 12, the rim 20 being moved eccentrically to permit it to pass over section 25a at its point of greatest diameter. To facilitate such passage the radially outward peripheral corners of permanent sub-felloe section 25a are bevelled as at 37.

If both sections of felloe 25 are left loose or demountable, the rim can be removed without moving rim 20 eccentrically, as it can be swung outwardly freely as both sections 25a and 25b are removed by demounting.

Between sections 25a and 25b there are formed tolerances 38 so that when the wedge ring 27 is tightened, the said tolerances enable the two sections to approach one another. The clamping of the rim 26 in place necessarily tightens the removable sub-felloe section 25b and 25a if that is also loose, so that no securing means other than those described are necessary.

It will be noted that the axes of studs 16, on which the nuts 33 are mounted are not in exact alignment with the axes of the perforations or apertures 30 and 31, but this is unnecessary in view of the construction of the socket wrench as shown.

It will thus be seen that a wheel has been devised having sub-felloes as they may be termed, for two rims and wherein the inboard sub-felloe is, if desired, a separate element from the master felloe in the interest of manufacture. Of course, the master felloe may be rolled from one piece under certain manufacturing conditions to include the sub-felloe member 19. Furthermore, that the master felloe 12 has been reduced in diameter to provide a deep sectioned sub-felloe 25 formed with passages large enough to permit the insertion of a socket wrench whereby the inner rim 20 may be adjusted or tightened as found necessary.

Various modifications may be made in the configuration of the cooperating elements going to make up this dual demountable rim as a whole and certain of the cooperating elements are capable of independent use as well as in the combination; all within the spirit and scope of the appended claims.

What I claim is:

1. In a dual demountable rim wheel, a master felloe band formed with a flange at its axially inward side to receive a felloe band and having a cylindrical felloe receiving surface, in combination with a felloe member of a radial depth equal to the flange and a felloe band.

2. An outboard felloe for a demountable rim wheel comprising two semi-circular sections, interlocking connections between the proximate ends of the sections and means to prevent radial movement of the sections with respect to the wheel.

3. An outboard felloe for a demountable rim wheel comprising two semi-circular sections, interlocking connections between the proximate ends of the sections, said sections being formed with slots for the reception of driving plates carried with the wheel and means to prevent radial movement of the sections with respect to the wheel.

4. In a dual demountable rim wheel, a master felloe band adapted to carry a pair of rims and formed with a flange at its axially inward side to receive a felloe band and an outboard felloe member of a radial depth equal to the flange and a felloe, said outboard felloe member being formed with a plurality of apertures for the passage of a socket wrench.

5. In a dual demountable rim wheel having a master felloe band adapted to carry a pair of rims, an outboard felloe comprising two semi-circular sections, one of which is permanently secured to the said master felloe band, and a driving plate carried with the master felloe band and adapted to be received in an aperture formed in the other felloe section.

6. In a dual demountable rim wheel, a master felloe band adapted to carry a pair of rims, an outboard felloe comprising a plurality of sections, one of which is permanently secured to the said master felloe band and a driving plate carried with the felloe band to be received in an aperture formed in another felloe section.

7. In a dual demountable rim wheel, a master felloe band adapted to carry a pair of rims, an outboard felloe comprising two semi-circular sections one of which is permanently secured to said master felloe band, and means to prevent axial movement of the proximate ends of the sections.

8. In a dual demountable rim wheel, a master felloe band adapted to carry a pair of rims, an outboard felloe comprising a plurality of sections, one of which is permanently secured to said felloe band, and means to prevent axial movement of the proximate ends of the sections.

9. In a duel demountable rim wheel, a master felloe band adapted to carry a pair of rims, an outboard felloe comprising two semi-circular sections, one of which is permanently secured to the said felloe band, a driving plate carried with the felloe band to be received in an aperture formed in the other felloe section, and interlocking connections for the proximate ends of the sections.

10. In a dual demountable rim wheel, a master felloe band adapted to carry a pair of rims, an outboard felloe comprising two semi-circular sections, one of which is permanently secured to the said felloe band, a driving plate carried with the felloe band to be received in an aperture formed in the other felloe section, and tongue and slot connections for the proximate ends of the section.

11. An outboard felloe for a dual demountable rim wheel comprising two semi-circular sections, one of which is adapted to be permanently secured to a master felloe and is formed with bevelled peripheral corners at its ends and the other of which is removably secured to the master felloe.

12. An outboard felloe for a dual demountable rim wheel comprising two semi-circular sections normally having a tolerance between the ends thereof, one of which sections is adapted to be permanently secured to a master felloe and is formed with beveled peripheral corners at its ends and the other of which is adapted to be removably secured to the master felloe.

13. In a dual demountable rim wheel having a master felloe band adapted to carry a pair of rims, an outboard felloe comprising two semi-circular sections, one of which is permanently secured to the said felloe band, and the other section being removably secured to the said felloe band.

14. In a dual demountable rim wheel, a master felloe band formed with a flange at its axially inward side to receive a felloe band and a cylindrical felloe receiving surface, in combination with a felloe member of a channel form, the cylindrical surface of the channel seating upon the cylindrical surface of the master felloe, said felloe member having a substantial radial depth equal to the flange and a felloe band.

In testimony whereof I affix my signature.

ALFRED M. LOFLAND.